United States Patent [19]
Rusnak

[11] Patent Number: 5,230,445
[45] Date of Patent: Jul. 27, 1993

[54] MICRO DELIVERY VALVE
[75] Inventor: Miro Rusnak, LaVerne, Calif.
[73] Assignee: City of Hope, Duarte, Calif.
[21] Appl. No.: 767,611
[22] Filed: Sep. 30, 1991
[51] Int. Cl.⁵ ............................................. G01F 11/06
[52] U.S. Cl. .................................. 222/207; 222/212; 222/309; 222/335
[58] Field of Search ............... 222/207, 212, 282, 309, 222/333, 334, 335, 336, 339, 380, 438, 444, 448–450, 407.2, 638, 639, 644, 504; 137/596; 251/129.17, 335.2

[56] References Cited

U.S. PATENT DOCUMENTS

| | | | |
|---|---|---|---|
| 3,162,324 | 12/1964 | Houser | 222/212 X |
| 3,162,336 | 12/1964 | Erickson | 222/335 X |
| 3,194,448 | 7/1965 | Theall | 222/309 X |
| 3,207,384 | 9/1965 | Wall | 222/309 X |
| 3,294,290 | 12/1986 | Erickson et al. | 222/335 |
| 4,863,066 | 9/1989 | Liffenheimer et al. | 222/334 X |
| 4,957,220 | 9/1990 | Du | 222/336 X |

Primary Examiner—Andres Kashnikow
Assistant Examiner—Philippe Derakshani
Attorney, Agent, or Firm—Edward S. Irons

[57] ABSTRACT

A pistonless device for metering a quantity of fluid from a source of fluid under pressure to a delivery line at a lesser pressure comprises a valve body defining a fluid flowpath, and including a fluid accumulator in fluid communication with the flowpath. An inlet valve upstream of the accumulator, and an exhaust valve downstream of the accumulator, are operated alternately in such a way that at most one of said valves is open at a time, so that positive metering displacement results.

5 Claims, 2 Drawing Sheets

MICRO DELIVERY VALVE

FIELD OF INVENTION

This invention relates to valves, and more particularly to a valve for metering and repeatedly delivering minute quantities of fluid from a source thereof which may be pressurized.

BACKGROUND OF THE INVENTION

Delivery of very small amounts of liquids or gases is often of critical importance in research instrumentation. One way of dispensing an amount of liquid is to open a valve in a line containing fluid under pressure for a precise period of time. However, closely controlling the open time of an on-off valve in a flow line is not sufficiently accurate in many circumstances, because of variations in fluid viscosity, pressure differential and the like. A positive displacement metering system provides better control of volumetric flow rates. Representative prior positive displacement dispensers or metering devices are shown in U.S. Pat. No. 3,072,302, U.S. Pat. No. 3,353,712, U.S. Pat. No. 4,271,989, U.S. Pat. No 4,327,845 and U.S. Pat. No. 4,805,815.

U.S. Pat. No. 4,327,845 to Keyes et al. shows a dispensing apparatus having a rotary valve controlling access to a closed chamber containing a spring-loaded piston, acting as a fluid accumulator. A liquid, such as a viscous syrup or topping, under pressure, is admitted to the chamber, driving the piston upward, when the rotary valve is in one position; in a second position of the valve, the chamber is connected to an outlet, and the piston expels the contents of the chamber. A disadvantage of the keyes system is that the phase relationship between the inlet and outlet events cannot be changed. Also, there is no provision for changing the spring pressure on the piston, so as to obtain varying accumulator displacement.

U.S. Pat. No. 3,353,712 describes a dispensing system incorporating a fluid accumulator. The accumulator piston is downwardly biased by a spring centered on an adjusting screw which can be advanced to contact the back side of the piston physically, to limit its motion.

The use of pistons in very small displacement metering systems is problematic because of the exaggerated effects of any piston seal leakage. Furthermore, piston seals have drag which may be unacceptable for situations involving very low pressure fluid sources. Seal drag is also affected by the nature and temperature of the working fluid.

SUMMARY OF THE INVENTION

The invention device for metering small precise quantities of fluid from a source under pressure. Frequently the device is positioned to meter fluids from a pressurized source into a delivery line. The metering device of the invention functions effectively without regard to variations or fluctuations in temperature, pressure or viscosity of the metered fluid. The volume of fluid delivered may vary from a fraction of microliters to many microliters. Larger volumes may be provided by repeated deliveries of small volumes.

The metering device of the invention comprises a valve body defining a fluid flowpath, a fluid accumulator fixed to the body and in fluid communication with the flowpath, an inlet valve in the fluid flowpath upstream of the accumulator, an exhaust valve, independent of the inlet valve, in the flowpath downstream of the accumulator, and means for alternately opening and closing the inlet and outlet valves in such a way that at most one of the valves is open at a time.

DEFINITIONS

As used herein, the term "fluid" means any flowable material, including gases, liquids and granular solids. "Valve" means any device for controlling fluid flow along a flowpath. "Accumulator" means a closed chamber device connected to a flowpath and capable of reversibly receiving a volume of fluid from the flowpath, wherein the fluid volume is a function of the pressure of the fluid. "Hermetic" means leakproof. A "diaphragm" is a substantially flexible or distendable hermetic fluid barrier.

BRIEF DESCRIPTION OF THE DRAWINGS

In the accompanying drawings.

DESCRIPTION OF THE PREFERRED EMBODIMENT

Figure 2:
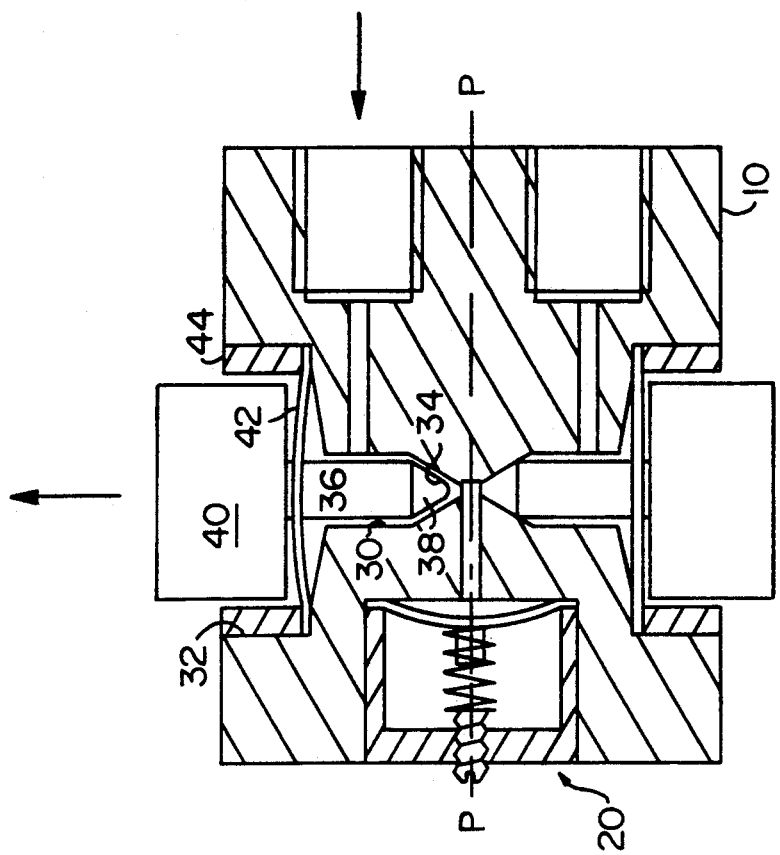
FIG. 2 is a view corresponding to FIG. 1, showing the device during its intake event.

As shown in FIGS. 1–4, a metering device embodying the invention comprises a valve body 10 having an inlet port 12 and an outlet port 14, the direction of fluid flow into and out of the device being indicated by arrows. Flow through the device is controlled by opposed inlet and outlet valves 16 and 18, in conjunction with an accumulator 20. A small passage 22 connects the inlet port to the inlet valve bore; another passage 24 connects the accumulator with each of the valve bores; and a third passage 26 connects the outlet port to the outlet valve bore. The inlet and outlet ports 12 and 14, the passages 22 and 26, and the valves 16 and 18 thus define a flowpath for fluid passing through the device.

Inasmuch as the inlet and outlet valves are identical, only one need be described in detail. As illustrated in FIG. 2, there is a bore 30 in the body, provided with a large counterbore at 32, and having a frustoconical bottom 34 functioning as a seat. The conical surfaces of the inlet and outlet valves have a common apex A, in fact, they have common generatrices. The common apex of the cones lies within the inner end of the passage 24 extending from the accumulator. The valve stem 36, which is slightly smaller in diameter than the bore 30, terminates at a frustoconical head 38 conforming to the geometry of the seat 34. The valve stem is connected to, or unitary with, the plunger 40 of a solenoid (of which only the plunger is shown, the rest being conventional). To prevent leakage, the valve stem is sealed by an annular, flexible diaphragm 42, whose inner periphery is hermetically connected to the valve stem, and whose outer periphery is held stationary at the bottom of the counterbore by a retaining ring 44, so that there is no relative movement of parts and thus no requirement for sliding seals. The bottom of the counterbore is slightly concave, providing clearance for diaphragm flexure.

Figure 3:
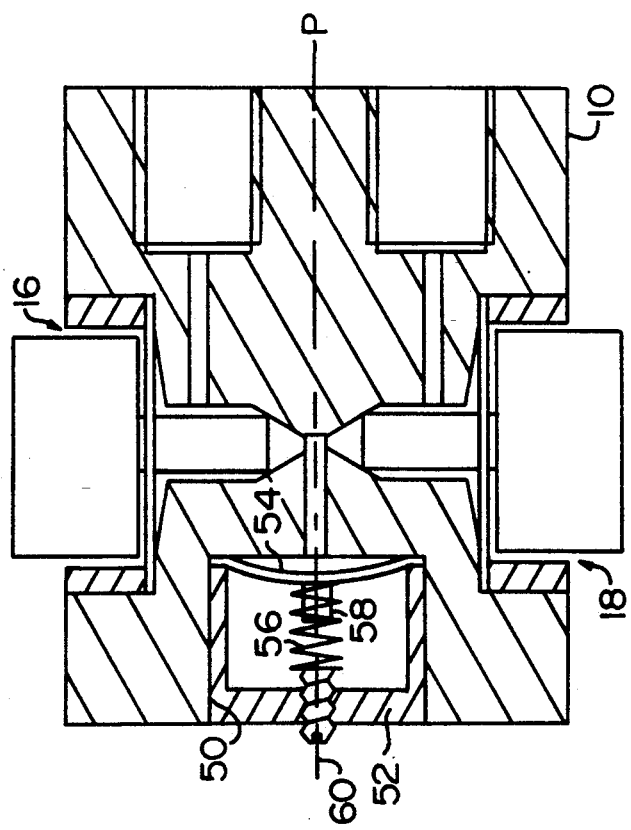
FIG. 3 is a view corresponding to FIG. 1, showing the valve during its dwell event.

The accumulator 20, whose passage 24 joins the flowpath at the common apex of the valve seats, is mounted in a flat-bottomed bore 50 (see FIG. 3), the axis of which is in the center plane P of the device. The inlet and outlet valves extend perpendicularly to this plane, and the inlet and outlet ports are parallel to it. An inverted cup 52 is pressed or otherwise hermetically fit within the bore 50. The rim of the cup bears against the periphery of a flexible diaphragm 54, which normally lies flat against the bottom of the bore 50, but can distend outwardly, as shown in FIG. 3, upon receiving fluid from the passage 24. The diaphragm is biased toward the FIG. 1 position (flat) both by its own resilience, and by the force from a compression coil spring 56 within the cavity. The spring is supported on the axis of the accumulator between a centering post 58 on the diaphragm, and an adjustment screw 60 extending through the center of the cup face. By advancing the screw, one can increase the spring bias on the diaphragm, affecting both the outlet pressure and the displacement. Other biasing means, such as a volume of compressible fluid with the cup, could be substituted for the spring.

There is no mechanical interconnection between the valves, so they may be operated electronically independent of one another. It may also be observed that the opposed disposition of the inlet and outlet valves minimizes the passageway volume between them, which helps produce precise metering.

Figure 1:
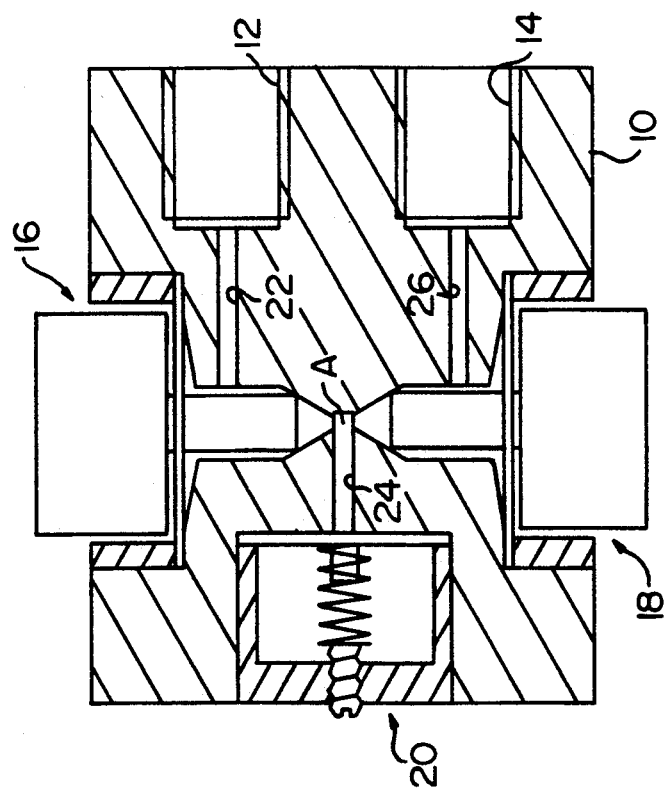
FIG. 1 is a simplified sectional view of a metering device embodying the invention, with both its valves closed.

In operation, a source of pressurized fluid to be measured is connected to an inlet port, and a delivery line is connected to the outlet port. The inlet and outlet valves are initially both closed, as shown in FIG. 1, and the accumulator is empty, its diaphragm lying flat at the bottom of the blind bore. To meter an amount of fluid, the device is cycled through the inlet, dwell and exhaust events depicted in FIGS. 2-4, by opening and closing the valves alternately, in such a way that at most one is open at a time. This prevents through-flow, which would destroy the positive displacement feature of the device.

In FIG. 2, the inlet valve has been opened by energizing its solenoid, allowing fluid under pressure to pass to the accumulator. The diaphragm deflects outwardly, admitting a volume of fluid, which volume is dependent upon the pressure differential across it, the flexibility of the diaphragm, and the initial tension and spring rate of the spring. The inlet valve is held open long enough for the accumulator to fill, that is, to reach equilibrium.

The inlet valve is then closed (FIG. 3), sealing off the accumulator. It is essential that there be at least a brief dwell period during which both of the valves are closed.

Figure 4:
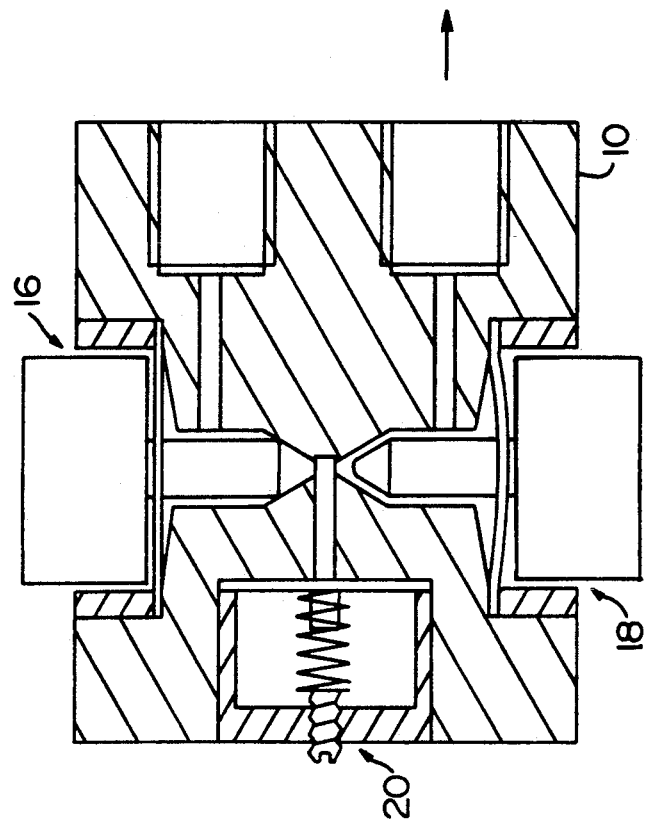
FIG. 4 is a view corresponding to FIG. 1, showing the valve during its exhaust event.

Subsequently, as shown in FIG. 4, the outlet valve is opened, whereupon the fluid in the accumulator flows toward the outlet (assuming that the delivery line is maintained at a pressure below that of the pressure source). The outlet valve is kept open long enough to allow the accumulator to empty, i.e., until the diaphragm is again flat, as shown in FIG. 4. Thus, the accumulator functions as a pump during the exhaust stroke of each cycle, and its filled volume is the pump displacement. By changing the inlet pressure, replacing the accumulator diaphragm, or altering the setting of the adjustment screw, the effective displacement can be varied.

An advantage of the colinear valve arrangement is that the volume of the flowpath between them is minimized, reducing one source of uncertainty as to the metered volume, which is particularly significant when compressible fluids are used. It is also an advantage to be able to control the valve independently, because by varying the phase and duration of each valve event, one can optimize the metering system for example by reducing the length of each cycle to a minimum.

Inasmuch as the invention is subject to modifications and variations, it is intended that the foregoing description and the accompanying drawings shall be interpreted as illustrative of only one form of the invention defined by the following claims.

I claim:

1. A device for metering a quantity of fluid from a source of fluid under pressure to a delivery line at a lesser pressure, said device comprising
   a valve body defining a fluid flowpath having upstream and downstream directions,
   a fluid accumulator fixed to the body and in fluid communication with the flowpath;
   an inlet valve in the fluid flowpath upstream of the accumulator;
   an outlet valve, independent of the inlet valve, in the flowpath downstream of the accumulator, and
   means for alternately opening and closing said inlet and outlet valves in such a way that at most one of said valves is open at a time, said inlet and outlet valves being opposed to one another and having colinear axes, and wherein each of said valves has a seat defined by a frustum of a cone and said cones have a common apex.

2. The invention of claim 1, wherein said accumulator is connected to said valves by a passage containing the common apex.

3. A device as defined in claim 1, further comprising a flexible diaphragm positioned in said accumulator, said diaphragm having one side exposed to said fluid and means for biasing said diaphragm to the side opposite said fluid.

4. A device as defined by claim 1, further comprising a flexible diaphragm positioned in said accumulator, said diaphragm having one side exposed to said fluid and means for biasing said diaphragm to the side opposite said fluid, said means for biasing comprising a coil spring and an adjusting screw supporting one end of said spring, whereby the biasing force of said spring can be varied.

5. A device for metering a quantity of fluid from a source of fluid under pressure to a delivery line at a lesser pressure, said device comprising:
   a valve body defining a fluid flowpath having upstream and downstream directions;
   a fluid accumulator fixed to the body and in fluid communication with the flowpath,
   an inlet valve in the fluid flowpath upstream of the accumulator,
   an outlet valve, independent of the inlet valve, in the flowpath downstream of the accumulator, and
   means for alternately opening and closing said inlet and outlet valves in such a way that at most one of said valves is open at a time, wherein each of said valves comprises
   a bore in the valve body, said bore terminating at a seat,
   a valve stem mounted for reciprocation within the bore, and having a tapered head for engaging said seat, and
   an annular, flexible diaphragm having an inner periphery hermetically connected to said stem, and an outer periphery hermetically connected to said valve body.

* * * * *